UNITED STATES PATENT OFFICE.

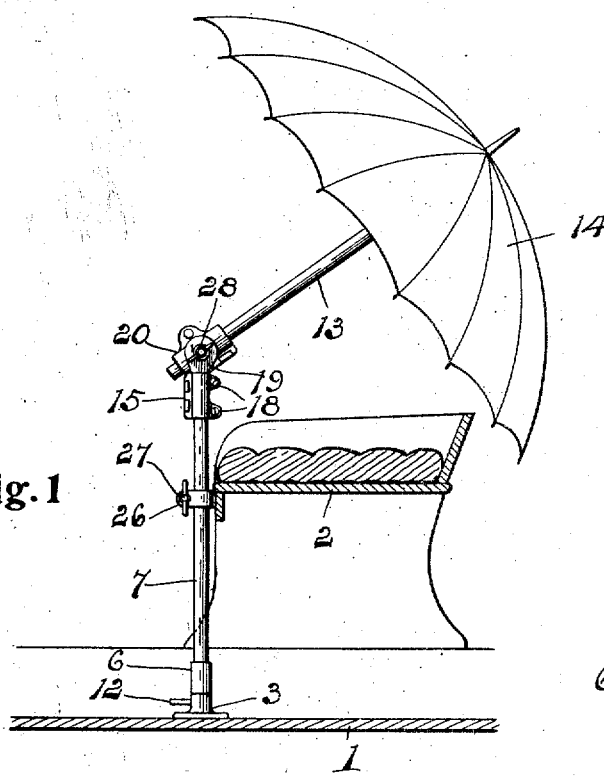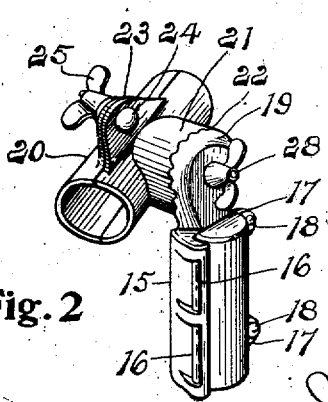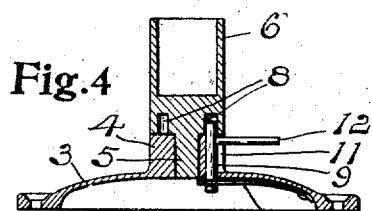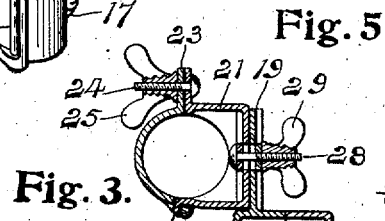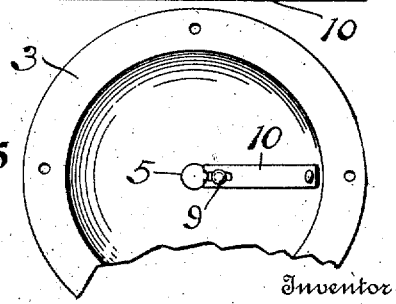

AUGUST PRANKE, OF HALFWAY, MICHIGAN.

UMBRELLA-SUPPORT.

970,751.    Specification of Letters Patent.    Patented Sept. 20, 1910.

Application filed July 1, 1910. Serial No. 569,908.

*To all whom it may concern:*

Be it known that I, AUGUST PRANKE, a citizen of the United States of America, residing at Halfway, in the county of Macomb and State of Michigan, have invented certain new and useful Improvements in Umbrella-Supports, of which the following is a specification, reference being had therein to the accompanying drawings.

This invention relates to an umbrella support for vehicles and its object is to provide certain new and useful features in the construction and arrangement of parts all as hereinafter more fully described and particularly pointed out in the claims reference being had to the accompanying drawing in which, Figure 1 is a side elevation of a device embodying the invention showing the same as applied to a vehicle; Fig. 2 is a perspective view of a combined socket and clamping member detached; Fig. 3 is a sectional detail of the same; Fig. 4 is a sectional detail of a floor plate; Fig. 5 is an inverted plan view of the same; and Fig. 6 is an end view of the ferrule member for the lower end of the supporting post.

As shown in the drawings 1 represents the floor of a vehicle body and 2 the vehicle seat. Secured to the floor 1 beneath the forward edge of the seat is a floor plate 3 having an upwardly extending hollow boss 4 to receive an axial pin 5 projecting from the lower end of a ferrule or socket member 6 which is firmly secured to the lower end of a vertically extending supporting post 7. In the end of the ferrule 6 is a series of holes 8 arranged around the pin 5. Movable in a suitable opening in the boss 4 of the floor plate 3 is a pin 9 normally held projected upward to engage the holes 8 by means of a spring 10 secured within the base plate and engaging the lower end of said pin 9. A slot 11 is provided in the boss 4 opening into the hole in which the pin 9 is adapted to slide and on said pin is an arm 12 projecting laterally outward through the slot by means of which arm the pin may be depressed to disengage its upper end from the hole 8 and permit the turning of the post 7.

A combined and relatively adjustable socket and clamp is supported upon the upper end of the post 7 to hold the staff 13 of an umbrella 14 of the usual construction. As commonly sold on the market these umbrellas are provided with a long staff and by cutting this staff in two the part cut off may be used to form the post 7. A socket member 15 engages the upper end of the post 7 and is made in halves for convenience of firmly securing the same to the upper end of the post, one part along one edge being formed with hooks 16 to engage suitable eyes formed on the mating edge of the other part to hinge connect the parts at that edge. The opposite edges of the two halves are provided with ears 17 formed with holes to receive clamping screws 18 for drawing the two halves together and firmly and permanently clamping the upper end of the post between. Formed integral with the upper end of the socket member is an upwardly extending ear 19 having a corrugated face and a clamping member 20 to receive and clamp the staff of the umbrella is formed in two parts with a laterally projecting portion 21 having a face 22 to interlock with the corrugations on the ear 19. A clamping bolt 28 in the axis of the portion 21 extends through an opening in the ear 19 and is screwthreaded to receive a thumb nut 29 which may be turned up against the ear 19 to draw the corrugated faces together. The two parts of the clamp are hinge connected at one side in the same manner that the two parts of the socket member are connected and the opposite edges of said parts are formed with outwardly extending ears 23 provided with openings to receive a clamping bolt 24 screwthreaded at one end for the engagement of a thumb nut 25 adapted to be turned upon the bolt to draw the two parts of the clamp together and firmly clamp the umbrella staff. The supporting post 7 is held in a vertical position adjacent to the forward edge of the seat by a split ring 26 secured to the forward edge of the seat and embracing said post, said ring being provided with a clamping screw 27 for drawing the divided edges of the ring together to clamp the post and prevent the same from moving within the ring.

The umbrella may be adjusted to any angle by loosening the thumb nut 29 and turning the clamping member upon the socket member, the interlocking corrugations firmly holding the parts in their adjusted positions when the thumb nut is again turned up. The height of the umbrella above the seat may be quickly and easily changed by loosening the thumb nut 25 and adjusting the staff longitudinally through the clamp 20 and the supporting post 7 may be rotated to turn the umbrella toward any point of the compass by depressing the pin 9 to disengage it from one of the holes 8. When so turned the pin will engage one of the other holes and firmly hold the post in its adjusted position.

Having thus fully described my invention what I claim is:—

1. A device of the character described comprising a floor plate having an opening, a vertically extending rotatable supporting post, a member secured to the lower end of said post provided with an axial pin engaging the opening in the floor plate and formed with a series of holes arranged concentrically with said pin, a longitudinally movable pin carried by the floor plate and adapted to engage said series of holes to lock the post in any position to which it may be turned, a socket member secured to the upper end of the post, a clamping member secured to the socket member and rotatively adjustable thereon, said clamping member being formed in two hinge connected parts, and means for securing the two parts of the clamping member together to clamp the umbrella staff therein.

2. A device of the character described comprising a floor member having an upwardly extending boss formed with an axial opening and with a vertical hole at one side of said opening having a lateral slot in one side; a vertically extending supporting post, a member secured to the lower end of said post provided with an axial pin engaging the axial opening in the plate and also formed with a series of holes arranged concentrically around said pin in the lower end of said member, a longitudinally movable pin in the slotted hole in the plate adapted to engage said series of holes, a spring secured to the plate and engaging the lower end of the movable pin to normally hold the same projected upward into engagement with one of said series of holes, a laterally extending arm on said movable pin extending outward through the said slot, and means on the upper end of said post for holding the umbrella staff and permit an angular adjustment of said staff relative to said post.

In testimony whereof I affix my signature in presence of two witnesses.

AUGUST PRANKE.

Witnesses:
OTTO F. BARTHEL,
ANNA M. DORR.